United States Patent [19]
Sirianni et al.

[11] Patent Number: 5,582,957
[45] Date of Patent: Dec. 10, 1996

[54] RESUSPENSION OPTIMIZATION FOR PHOTOGRAPHIC NANOSUSPENSIONS

[75] Inventors: John F. Sirianni, Webster; Robert H. Nuttall; John Texter, both of Rochester, all of N.Y.

[73] Assignee: Eastman Kodak Company, Rochester, N.Y.

[21] Appl. No.: 412,236

[22] Filed: Mar. 28, 1995

[51] Int. Cl.$^6$ .............................. B65D 23/04; F15D 1/00; G03C 1/00

[52] U.S. Cl. .................... 430/347; 430/644; 215/370; 215/371; 215/372; 215/373; 215/382; 215/383; 220/604; 220/608; 220/669; 220/670

[58] Field of Search ................... 430/347, 644; 215/370, 371, 372, 373, 382, 383; 220/604, 608, 669, 670

[56] References Cited

U.S. PATENT DOCUMENTS

| | | | |
|---|---|---|---|
| H953 | 8/1991 | Goto et al. | 430/393 |
| 1,127,141 | 2/1915 | Whitcomb | 215/382 |
| 2,399,083 | 4/1946 | Waller et al. | 95/7 |
| 2,448,060 | 8/1948 | Smith et al. | 95/7 |
| 2,487,850 | 11/1949 | Carroll | 95/7 |
| 2,493,748 | 1/1950 | Brooker et al. | 260/240 |
| 2,503,776 | 4/1950 | Sprague | 260/240.5 |
| 2,518,698 | 8/1950 | Lowe et al. | 95/7 |
| 2,519,001 | 8/1950 | Sprague | 260/240.4 |
| 2,521,925 | 9/1950 | Lowe et al. | 95/7 |
| 2,521,926 | 9/1950 | Lowe et al. | 95/7 |
| 2,540,085 | 2/1951 | Baldstefen | 95/7 |
| 2,566,245 | 8/1951 | Trivelli et al. | 95/7 |
| 2,566,263 | 8/1951 | Trivelli et al. | 95/7 |
| 2,581,414 | 1/1952 | Hochberg | 241/22 |
| 2,597,856 | 5/1952 | Damschroder | 95/7 |
| 2,597,915 | 5/1952 | Yutzy et al. | 95/7 |
| 2,598,079 | 5/1952 | Stauffer et al. | 964/561 |
| 2,688,545 | 9/1954 | Carroll et al. | 95/7 |
| 2,694,637 | 11/1954 | Gray | 95/7 |

(List continued on next page.)

FOREIGN PATENT DOCUMENTS

| | | |
|---|---|---|
| 16503/83 | 1/1984 | Australia . |
| 0524802A1 | 1/1993 | European Pat. Off. . |
| 0549489A1 | 6/1993 | European Pat. Off. . |
| 0556034A1 | 8/1993 | European Pat. Off. . |
| 2398196 | 2/1979 | France . |
| 53-18504 | 2/1978 | Japan . |
| 62-136645 | 6/1987 | Japan . |
| 1193349 | 5/1970 | United Kingdom . |
| 1570362 | 3/1977 | United Kingdom . |

OTHER PUBLICATIONS

Research Disclosure, Dec. 1989, No. 308119, pp. 993–1015.
Research Disclosure, Dec. 1978, No. 17643, pp. 22–31.

Primary Examiner—Mark F. Huff
Attorney, Agent, or Firm—Arthur H. Rosenstein

[57] ABSTRACT

A method for storing nanoparticulate suspensions of photographically useful compounds is disclosed that comprises the steps of:

providing a suspension of nanoparticulate photographically useful chemical substance in the form of a solid particle dispersion;

providing a hydrodynamically optimized container for storing nanoparticulate suspensions comprising a base portion and a body portion unitary with said base portion, said portions defining an interior storage chamber hydrodynamically optimized for the resuspension of sedimented nanoparticulate suspensions, said body portion further comprising a body wall with interior and exterior surfaces;

placing said solid particle dispersion in said container;

sealing said container and storage chamber against the ambient atmosphere to form a sealed container;

storing said sealed container;

opening said sealed container; and using a portion of said solid particle dispersion stored in said container to form a coating composition for a light-sensitive element.

23 Claims, 3 Drawing Sheets

U.S. PATENT DOCUMENTS

| | | | |
|---|---|---|---|
| 2,699,596 | 1/1955 | Aronson | 220/604 |
| 2,796,294 | 6/1957 | McKinnon | 299/88 |
| 2,855,156 | 10/1958 | Hochberg | 241/22 |
| 2,912,329 | 11/1959 | Jones et al. | 96/100 |
| 2,977,229 | 3/1961 | Jones | 96/104 |
| 2,983,610 | 5/1961 | Allen et al. | 96/108 |
| 2,995,533 | 8/1961 | Parmer et al. | 260/23 |
| 3,083,883 | 4/1963 | Glidden | 222/567 |
| 3,114,932 | 12/1963 | Donnelly | 18/5 |
| 3,137,748 | 6/1964 | Makowski | 264/97 |
| 3,176,883 | 4/1965 | Davis, Jr. | 222/193 |
| 3,200,995 | 8/1965 | Gangwisch | 222/94 |
| 3,201,254 | 8/1965 | Reynolds et al. | 96/107 |
| 3,227,550 | 1/1966 | Whitmore et al. | 96/3 |
| 3,282,729 | 11/1966 | Richardson et al. | 117/138.8 |
| 3,323,689 | 6/1967 | Elmore | 222/385 |
| 3,363,808 | 1/1968 | Gorman | 222/193 |
| 3,384,081 | 5/1968 | Castiglione | 128/218 |
| 3,397,060 | 8/1968 | Schwan et al. | 96/104 |
| 3,443,939 | 5/1969 | Bloom et al. | 96/3 |
| 3,469,987 | 9/1969 | Owens et al. | 96/102 |
| 3,498,785 | 3/1970 | Bloom et al. | 96/3 |
| 3,522,052 | 7/1970 | Shiba et al. | 96/104 |
| 3,527,641 | 9/1970 | Nakazawa et al. | 96/104 |
| 3,589,563 | 6/1971 | Carrogan et al. | 222/70 |
| 3,591,089 | 7/1971 | Cronan | 239/304 |
| 3,615,635 | 10/1971 | Shiba et al. | 96/126 |
| 3,617,293 | 11/1971 | Shiba et al. | 96/124 |
| 3,628,964 | 12/1971 | Shiba et al. | 96/124 |
| 3,656,959 | 4/1972 | Kimura et al. | 96/127 |
| 3,666,480 | 5/1972 | Shiba et al. | 96/124 |
| 3,672,897 | 6/1972 | Sato et al. | 96/74 |
| 3,672,898 | 6/1972 | Schwan et al. | 96/74 |
| 3,676,147 | 7/1972 | Boyer et al. | 96/130 |
| 3,679,428 | 7/1972 | Shiba et al. | 96/124 |
| 3,694,217 | 9/1972 | Sakaguchi et al. | 96/130 |
| 3,703,377 | 11/1972 | Sakazume et al. | 96/122 |
| 3,734,726 | 5/1973 | Figueras et al. | 96/3 |
| 3,743,504 | 7/1973 | Dappen et al. | 96/3 |
| 3,797,748 | 3/1974 | Nozawa et al. | 239/321 |
| 3,814,609 | 6/1974 | Shiba et al. | 96/124 |
| 3,837,862 | 9/1974 | Shiba et al. | 96/126 |
| 3,864,151 | 2/1975 | Shonebarger et al. | 117/72 |
| 3,928,312 | 12/1975 | Fleckenstein | 260/156 |
| 3,955,720 | 5/1976 | Malone | 222/396 |
| 3,956,441 | 5/1976 | Uhlig | 264/89 |
| 3,986,644 | 10/1976 | Grogan et al. | 222/207 |
| 3,987,006 | 10/1976 | Kitchen et al. | 260/45.85 |
| 3,995,774 | 12/1976 | Cooprider et al. | 222/207 |
| 3,995,776 | 12/1976 | Micallef | 222/207 |
| 4,006,025 | 2/1977 | Swank et al. | 96/129 |
| 4,024,975 | 5/1977 | Uhlig | 215/1 C |
| 4,025,349 | 5/1977 | Mee | 96/120 |
| 4,026,707 | 5/1977 | Obikawa et al. | 96/95 |
| 4,046,572 | 9/1977 | Hinata et al. | 96/69 |
| 4,072,252 | 2/1978 | Steyns et al. | 222/341 |
| 4,076,529 | 2/1978 | Fleckenstein et al. | 96/3 |
| 4,077,549 | 3/1978 | Beard | 222/321 |
| 4,078,508 | 3/1978 | Schertenleib | 113/120 A |
| 4,082,223 | 4/1978 | Nozawa | 239/333 |
| 4,087,023 | 5/1978 | Szczepanski | 222/209 |
| 4,091,966 | 5/1978 | Laauwe | 222/211 |
| 4,121,772 | 10/1978 | Cronan | 239/304 |
| 4,129,235 | 12/1978 | Hass | 222/321 |
| 4,141,730 | 2/1979 | Minagawa et al. | 96/9 |
| 4,151,249 | 4/1979 | Lee | 264/520 |
| 4,157,774 | 6/1979 | Micallef | 222/321 |
| 4,170,622 | 10/1979 | Uhlig | 264/520 |
| 4,215,195 | 7/1980 | Ponticello et al. | 430/496 |
| 4,230,277 | 10/1980 | Tada | 239/333 |
| 4,235,373 | 11/1980 | Clark | 239/34 |
| 4,248,962 | 2/1981 | Lau | 430/382 |
| 4,260,079 | 4/1981 | Cary et al. | 222/209 |
| 4,266,014 | 5/1981 | Moelants et al. | 430/522 |
| 4,288,534 | 9/1981 | Lemahieu et al. | 430/522 |
| 4,294,916 | 10/1981 | Postle et al. | 430/522 |
| 4,294,917 | 10/1981 | Postle et al. | 430/522 |
| 4,310,107 | 1/1982 | Wesner | 222/214 |
| 4,313,568 | 2/1982 | Shay | 239/333 |
| 4,334,627 | 6/1982 | Krishnakumar et al. | 215/1 C |
| 4,352,443 | 10/1982 | Libit | 222/207 |
| 4,357,412 | 11/1982 | Anderson et al. | 430/223 |
| 4,358,525 | 11/1982 | Mooberry et al. | 430/217 |
| 4,359,165 | 11/1982 | Jakobsen | 220/675 |
| 4,378,424 | 3/1983 | Altland et al. | 430/352 |
| 4,403,706 | 9/1983 | Mahajan | 215/1 C |
| 4,415,122 | 11/1983 | Laauwe | 239/327 |
| 4,420,556 | 12/1983 | Booms et al. | 430/549 |
| 4,456,134 | 6/1984 | Cooper | 215/382 |
| 4,474,872 | 10/1984 | Onishi et al. | 430/512 |
| 4,525,401 | 6/1985 | Pocock et al. | 428/64 |
| 4,538,542 | 9/1985 | Kennon et al. | 118/302 |
| 4,554,243 | 11/1985 | Ono et al. | 430/543 |
| 4,558,821 | 12/1985 | Tada et al. | 239/333 |
| 4,566,600 | 1/1986 | Chang | 215/371 |
| 4,624,413 | 11/1986 | Corsette | 239/333 |
| 4,690,885 | 9/1987 | Yagihara et al. | 430/212 |
| 4,728,009 | 3/1988 | Schmidt | 222/321 |
| 4,734,704 | 3/1988 | Mizutani et al. | 346/76 |
| 4,770,984 | 9/1988 | Ailliet et al. | 430/505 |
| 4,791,095 | 12/1988 | Ikeda et al. | 503/209 |
| 4,855,221 | 8/1989 | Factor et al. | 430/510 |
| 4,877,721 | 10/1989 | Diehl et al. | 430/522 |
| 4,900,652 | 2/1990 | Dickerson et al. | 430/502 |
| 4,900,653 | 2/1990 | Factor et al. | 430/522 |
| 4,904,565 | 2/1990 | Schmidt et al. | 430/264 |
| 4,912,048 | 3/1990 | Smith et al. | 435/296 |
| 4,923,788 | 5/1990 | Shuttleworth et al. | 430/507 |
| 4,927,744 | 5/1990 | Henzel et al. | 430/566 |
| 4,940,654 | 7/1990 | Diehl et al. | 430/522 |
| 4,948,717 | 8/1990 | Diehl et al. | 430/510 |
| 4,948,718 | 8/1990 | Factor et al. | 430/522 |
| 4,977,005 | 12/1990 | Krishnakumar et al. | 428/36.92 |
| 4,991,734 | 2/1991 | Nilsson et al. | 220/604 |
| 4,994,356 | 2/1991 | Diehl et al. | 430/522 |
| 5,008,179 | 4/1991 | Chari et al. | 430/546 |
| 5,014,884 | 5/1991 | Wunsch | 222/333 |
| 5,019,492 | 5/1991 | Buchanan et al. | 430/543 |
| 5,038,972 | 8/1991 | Muderlak et al. | 222/25 |
| 5,055,373 | 10/1991 | Saeki et al. | 430/130 |
| 5,110,717 | 5/1992 | Czekai et al. | 430/512 |
| 5,126,177 | 6/1992 | Stenger | 428/36.92 |
| 5,168,029 | 12/1992 | Igarashi et al. | 430/138 |
| 5,191,987 | 3/1993 | Niimi et al. | 215/371 |
| 5,205,442 | 4/1993 | Harris et al. | 222/341 |
| 5,213,939 | 5/1993 | Sugiyama et al. | 430/138 |
| 5,216,438 | 6/1993 | Nakao et al. | 346/76 |
| 5,230,429 | 7/1993 | Etheredge, III | 206/459.1 |
| 5,240,821 | 8/1993 | Texter et al. | 430/405 |
| 5,242,066 | 9/1993 | Kelsey | 215/1 C |
| 5,249,718 | 10/1993 | Muderlak | 222/642 |
| 5,256,525 | 10/1993 | Southby et al. | 430/380 |
| 5,267,674 | 12/1993 | von Schuckmann | 222/383 |
| 5,274,109 | 12/1993 | Texter | 548/365.4 |
| 5,288,560 | 2/1994 | Sudo et al. | 428/494 |
| 5,296,329 | 3/1994 | Sugiyama et al. | 430/138 |
| 5,298,373 | 3/1994 | Sasaoka et al. | 430/429 |
| 5,304,542 | 4/1994 | Tatakis | 514/12 |
| 5,322,758 | 6/1994 | Texter et al. | 430/213 |
| 5,344,045 | 9/1994 | Richter et al. | 215/382 |
| 5,360,695 | 11/1994 | Texter | 430/203 |
| 5,401,623 | 3/1995 | Texter | 430/546 |

RESUSPENSION OPTIMIZATION FOR PHOTOGRAPHIC NANOSUSPENSIONS

RELATED APPLICATIONS

This application is related to copending U.S. application Ser. No. 08/384,992, *Hydrodynamically Optimized Vials for Nanoparticulate Suspensions of Drugs* of Sirianni et al., filed Feb. 7, 1995.

FIELD OF THE INVENTION

This invention relates to the design and fabrication of containers for the storage of nanoparticulate suspensions of photographically useful compounds, to the storage of nanoparticulate suspensions of photographically useful compounds in such containers, and to the formation of light-sensitive elements using photographically useful compounds stored in such containers.

BACKGROUND OF THE INVENTION

Nanosuspensions of photographically useful compounds are becoming increasingly prevalent in the photographic industry. Processes that produce submicron solid particle colloids have found advantageous use in producing dispersions of photographically useful compounds such as filter dyes, sensitizing dyes, etc. U.S Pat. Nos. 4,294,916 and 4,294,917 to Postle et al. describe solid particle dispersions of photographic filter dyes and point out that such solid particle dispersions provide broad spectral absorptions. The preparation and use of solid particle dispersions of sensitizing dyes are disclosed in German Patent No. 1,547,705. Milling processes for producing solid particle dispersions using sand, bead, dyno, and Masap mills, and using mills described in U.S. Pat. Nos. 2,581,414 and 2,855,156 are disclosed in British Patent No. 1,570,362. The British patent discloses that non-diffusing, slightly soluble color couplers can be dispersed as solid particle dispersions. Development inhibitor releasing (DIR) couplers, spectral sensitizing dyes, and photographic stabilizers are also disclosed in this British patent as being dispersed as solid particle dispersions.

The art of precipitation of organic substances having relatively low water solubility, starting from a solution state to a stable fine particle colloidal dispersion is known. Such precipitation is generally achieved by dissolving the substance in a water-miscible solvent aided by addition of base to ionize the substance, addition of a dispersing aid with subsequent precipitation of the substance by lowering pH or by shifting the concentration of two or miscible solvents such that the substance is no longer soluble in the continuous phase and precipitates as a colloidal dispersion or slurry.

Townsley et al., in U.K. Pat. No. 1,193,349, disclose a process whereby a color coupler is dissolved in a mixture of water-miscible organic solvent and aqueous alkali. The coupler solution is then mixed with an aqueous acid and a protective colloid, to form a dispersion of the color coupler by pH shift. Such a dispersion can be mixed with an aqueous silver halide emulsion and coated on a support, and incorporated into a photographic element.

Langen et al., in U.K. Pat. No. 1,570,362 disclose the use of solid particle milling methods such as sand milling, bead milling, dyno milling, and related media, ball, and roller milling methods for the production of solid particle dispersions of photographic additives such as couplers, UV-absorbers, UV stabilizers, white toners, stabilizers, and sensitizing dyes.

Henzel and Zengerle, in U.S. Pat. No. 4,927,744, disclose photographic elements comprising solid particle dispersions of oxidized developer scavengers. Said dispersions are prepared by precipitation and by milling techniques such as ball-milling.

Boyer and Caridi, in U.S. Pat. No. 3,676,147, disclose a method of ball-milling sensitizing dyes in organic liquids as a means of spectrally sensitizing silver halide emulsions. Langen et al., in Canadian Patent No. 1,105,761, disclose the use of solid particle milling methods and processes for the introduction of sensitizing dyes and stabilizers in aqueous silver salt emulsions.

Swank and Waack, in U.S. Pat. No. 4,006,025, disclose a process for dispersing sensitizing dyes, wherein said process comprises the steps of mixing the dye particles with water to form a slurry and then milling said slurry at an elevated temperature in the presence of a surfactant to form finely divided particles. Onishi et al., in U.S. Pat. No. 4,474,872, disclose a mechanical grinding method for dispersing certain sensitizing dyes in water without the aid of a dispersing agent or wetting agent. This method relies on pH control in the range of 6–9 and temperature control in the range of 60°–80° C.

Moelants and Depoorter, in U.S. Pat. No. 4,266,014, Lemahieu et al., in U.S. Pat. No. 4,288,534, Postle and Psaila, in U.S. Pat. Nos. 4,294,916 and 4,294,917, 1981, Anderson and Kalenda, in U.S. Pat. No. 4,357,412, Ailliet et al., in U.S. Pat. No. 4,770,984, Factor and Diehl, in U.S. Pat. No. 4,855,221, Diehl and Reed, in U.S. Pat. No. 4,877,721, Dickerson et al., in U.S. Pat. No. 4,900,652, Factor and Diehl, in U.S. Pat. No. 4,900,653, Schmidt and Roca, in U.S. Pat. No. 4,904,565, Shuttleworth et al., in U.S. Pat. No. 4,923,788, Diehl and Factor, in U.S. Pat. No. 4,940,654, Diehl and Factor, in U.S. Pat. No. 4,948,717, Factor and Diehl, in U.S. Pat. No. 4,948,718, Diehl and Brown, in U.S. Pat. No. 4,994,356, disclose filter dyes and solid particle dispersions of dyes for use as filter dyes in photographic elements. They disclose that such dyes can be dispersed as solid particle dispersions by precipitating or reprecipitating (solvent or pH shifting), by ball-milling, by sand-milling, or by colloid-milling in the presence of a dispersing agent. Photographic elements containing such filter dyes and dispersions thereof are disclosed.

Komamura, in unexamined Japanese Kokai No. Sho 62[1987]-136645, discloses solid particle dispersions of heat solvent, wherein said heat solvent has a melting point of 130° C. or greater. These heat solvent dispersions are incorporated in a thermally developed photosensitive material incorporating silver halide, a reducing agent, and a binder on a support, wherein said material obtains improved storage stability.

Chari et al., in U.S. Pat. No. 5,008,179, discloses methods for forming dispersions of photographic couplers, wherein aqueous dispersions of photographic coupler and of activating permanent solvent are combined and mixed with silver halide emulsion. Czekai and Bishop, in U.S. Pat. No. 5,110,717, disclose a process for making amorphous coupler dispersions from solid particle microcrystalline dispersions.

Texter et al., in U.S. Pat. No. 5,240,821, disclose solid particle dispersions of developer precursors, and photographic elements containing such dispersions. Texter, in U.S. Pat. No. 5,274,109, discloses microprecipitated methine oxonol filter dye dispersions. These dispersions are prepared with close attention paid to the stoichiometric amounts of acid used in the microprecipitation process.

Texter, in U.S. Pat. No. 5,360,695, discloses solid particle thermal solvent dispersions and aqueous developable dye diffusion transfer elements containing them. Texter, in U.S. Pat. No. 5,401,623, discloses nanoparticulate microcrystalline coupler dispersions wetted with coupler solvent. Texter, in U.S. Ser. No. 08/125,990 filed Sep. 23, 1993, discloses solid particle coupler dispersions for use in color diffusion transfer element.

U.S. Pat. No. 2,796,294 discloses in FIGS. 1 and 2 therein, container designs. U.S. Pat. No. 3,176,883 discloses in FIG. 1 therein an axisymmetric container design that has a bottom portion of greater diameter than the body portion, and wherein the diameter of said body portion increases steadily from the top of said body portion to where the body portion meets the bottom portion. U.S. Pat. No. 3,200,995 discloses in FIG. 1 therein a container design. U.S. Pat. No. 3,323,689 discloses in FIG. 3 therein a container design. U.S. Pat. No. 3,363,808 discloses, in FIGS. 1 and 9 therein, container designs. An airspace type spray dispenser for dispensing liquids in spray form is disclosed in U.S. Pat. No. 4,087,023. A squeeze bottle for dispensing a dry powder is disclosed in U.S. Pat. No. 4,091,966. When the bottle is inverted, the construction is such that a carrier stream of air, when the bottle is squeezed, is discharged through a fed stream of the powder. A right-angle spray nozzle for a squeeze bottle is disclosed in U.S. Pat. No. 4,415,122.

Traditionally, blown plastic bottles are processed in a manner which attempts to optimize strength and integrity of the container by various means of arranging the polymer molecules. An amorphous thermoplastic parison made of the crystallizable thermoplastics such as polyesters may be mechanically stressed at temperatures between the glass transition temperature and the melting point of the material, and then rapidly cooled to align the molecular structure and achieve high strength in the direction of molecular orientation. It is known in the prior art to injection mold a plastic parison having a localized thickened region which reinforces the heel of a blown bottle, as disclosed by Makowskyin U.S. Pat. No. 3,137,748.

Containers with internal rib structures are known in the art. Donnelly, in U.S. Pat. No. 3,114,932, teaches to extrude a tubular plastic parison having external reinforcing ribs which are reversed during the blow molding process to provide internal reinforcement to a blown container. Stena and Smith, in U.S. Pat. No. 4,912,048, disclose a bottle shaped culture vessel with fluted body wall providing internal ribbing. This internal ribbing provides increased internal surface area for the anchorage of cells and also provides enhanced agitation for the dispersal of cells, where improved dispersal and increased anchorage promote cell growth. U.S. Pat. No. 4,024,975 discloses a blow molded thin walled bottle with local internal ribbing formed by reversal of external ribs on a preform. Krishnakumar et al., in U.S. Pat. No. 4,977,005, Procock et al., in U.S. Pat. No. 4,525,401, and KriShnakumar et al. in U.S. Pat. No. 4,334,627, disclose a ribbed preform for forming a plastic container by blow molding. This preform is used to produce a bottle with a bottom reinforced with internal radiating ribs. Mahajan, in U.S. Pat. No. 4,403,706, discloses an improved preform for blow molding a plastic container having a "champagne bottle style" base, wherein tubular, hollow ribs for stiffening the bottom of the container are taught.

Methods for forming bottles and containers by various plastics molding operations are known in the art. Stenger, in U.S. Pat. No. 5,126,177, discloses a blow molding preform for a bottle with reinforcing ribs. This preform comprises angularly spaced ribs on a frusto-conical surface that are converted to internal ribs by molding a polyethylene terephthalate bottle. Japanese Publication No. 78-18504 discloses a hollow plastic article having internal ribs, whereby molten resin is injected into a molding cavity through a flow control ring having projections. These projections comprise inwardly projected obstructions on the walls of the ring so that the molten resin has a corresponding cross-section when it is injected into the molding cavity. Lee, in U.S. Pat. No. 4,151,249, discloses a method of making blown plastic bottles with at least one internal rib. Uhlig, in U.S. Pat. No. 3,956,441, discloses a method of making blown bottles having interior ribbed surfaces. Uhlig teaches to preblow a parison into a pre-blow mold having concave grooves patterned within its cavity walls, thereby forming an intermediate article with external ribs, and then finally blowing the intermediate article within a blow mold such that the bulbous ribs are inverted to form internal ribs.

The particulates in nanoparticulate suspensions typically have a density greater than the continuous phase of the nanoparticulate suspensions. As time passes, these particulates settle to form sediment that must be redispersed in order to obtain the expected concentration of suspended particulate in the suspension as a whole.

This sediment is the cause of previously unrecognized problems encountered when such suspensions are formed into light-sensitive coating compositions and elements. Densely packed sediments may in part break up upon shaking or mixing, but cause numerous large flocs of photographically useful nanoparticulates to persist in suspension, even after vigorous mixing. Such large flocs can cause significant coating defects when coating compositions comprising such flocs are applied in the formation of multilayer light-sensitive elements. Such large flocs can cause significant and unwanted light scattering in light-sensitive elements formed therefrom, and such light scattering can result in halation, speed loss, unwanted turbidity and loss of gloss, and color imbalance, as well as other unwanted and deleterious effects. When the photographically useful compound of such nanoparticulate suspensions is a key sensitizing compound, such as a sensitizing dye, a chemical sensitizing agent, or an organic-sulfur-based ripening agent, the resulting photographic speed of the light-sensitive element obtained may suffer a significant speed loss if the activity and concentration of sensitizing compound is too low in the suspension used. When nanoparticulate suspensions of such sensitizing compounds form dense sediment upon storage, they typically will not reconstitute upon shaking, stirring, or agitation, to completely disperse all of the sediment formed, and the resulting suspension is too low in concentration with respect to the sensitizing compound suspended therein.

SUMMARY OF THE INVENTION

An object of the invention is to provide improved containers particularly designed for the storage of photographic nanoparticulate suspensions. Another object of the invention is to provide improved methods of storing nanoparticulate suspensions, so that these suspensions may easily be resuspended with mild shaking. Yet another object of the invention is to provide methods of forming and manufacturing improved containers for the storage of nanoparticulate photographic suspensions.

The objects of the present invention may generally be obtained by providing a method for storing nanoparticulate suspensions of photographically useful compounds comprising the steps of:

providing a suspension of nanoparticulate photographically useful chemical substance in the form of a solid particle dispersion;

providing a hydrodynamically optimized container for storing nanoparticulate suspensions comprising a base portion and a body portion unitary with said base portion, said portions defining an interior storage chamber hydrodynamically optimized for the resuspension of sedimented nanoparticulate suspensions, said body portion further comprising a body wall with interior and exterior surfaces;

placing said solid particle dispersion in said container;

sealing said container and storage chamber against the ambient atmosphere to form a sealed container;

storing said sealed container.

A method for forming coating melts of nanoparticulate suspensions of photographically useful compounds comprising the steps of:

providing a suspension of nanoparticulate photographically useful chemical substance in the form of a solid particle dispersion;

providing a hydrodynamically optimized container for storing nanoparticulate suspensions comprising a base portion and a body portion unitary with said base portion, said portions defining an interior storage chamber hydrodynamically optimized for the resuspension of sedimented nanoparticulate suspensions, said body portion further comprising a body wall with interior and exterior surfaces;

placing said solid particle dispersion in said container;

sealing said container and storage chamber against the ambient atmosphere to form a sealed container;

storing said sealed container;

opening said sealed container; and taking a portion of said solid particle dispersion stored in said container to form a coating composition for a light-sensitive element.

opening said sealed container; and using a portion of said solid particle dispersion stored in said container to form a coating composition for a light-sensitive element.

The methods of the present invention provide improved resuspension of sedimented nanoparticulates of photographically useful compounds. Such improved resuspension results in improved covering power obtained from chromogenic photographic elements formed with such nanoparticulates, when filter dyes or UV absorber dyes are suspended as the photographically useful nanoparticulates in the methods of the present invention. Such improved resuspension generally results in less flocculated photographically useful nanoparticulate suspensions of the method of the present invention, and superior light-sensitive elements formed with such suspensions are thereby obtained. The elements of the methods of the present invention obtained thereby have fewer unwanted flocs incorporated therein, and suffer less from unwanted and deleterious light scattering that often accompanies such unwanted flocs. The methods of the present invention also yield the advantage of having elements with improved properties, such as photographic speed, since the improved resuspension of the methods of the present invention provide for higher specific activity and concentration in the resulting suspension when used in forming a photographic element. Such an improvement allows for more efficient use of the photographically useful material in the nanoparticulate suspension of the method of the invention.

BRIEF DESCRIPTION OF THE DRAWINGS

FIG. 1. Comparison container of approximately 10 mL volume (Nalge).

FIG. 2. Comparison 10 mL container (West).

FIG. 3. Invention body-bottom portion illustrating radii of curvature.

FIG. 4. Illustration of interior surfaces of body, connecting, and bottom portions when connecting and cylindrical radii are equal.

FIG. 5. Invention container with connecting radius about 50% of the cylindrical radius.

FIG. 6. Invention container with equal connecting and cylindrical radii.

FIG. 7. Invention container with equal connecting and cylindrical radii suitable for injection molding manufacture.

FIG. 8. Invention container with equal connecting and cylindrical radii suitable for injection molding manufacture.

FIG. 9. Invention container having 2 out-of-phase rifled ribs.

FIG. 10. Invention container having 2 in-phase rifled ribs.

DETAILED DESCRIPTION OF THE INVENTION

For the purposes of the present disclosure the term "nanoparticulate" means a solid particle of colloidal size less than 5,000 nm in average dimension. Such a dimension corresponds to diameter when the particle is spherical. When the particle is not spherical, such a dimension corresponds to the arithmetic average of the three longest dimensions obtained parallel, respectively, to the three principal moments of inertia for the particle. The directions of these inertial moments may be determined for any solid body (see R. C. Hibbeler's *Engineering Mechanics & Dynamics*, Fourth Edition, Copyright 1986, Macmillan Publishing Company).

For the purposes of the present disclosure the term "solid particle dispersion" means a colloidal particulate dispersion in an aqueous based continuous phase (greater than 50% by weight water). In this disclosure the terms "dispersion" and "suspension" are synonymous.

For the purposes of the present disclosure the term "interior surface" means that surface of the containers of the present invention that can be wetted with an aqueous based nanoparticulate suspension or with a solid particle dispersion, during normal storage of such a suspension or dispersion in a vial or container according to the present invention. Capping material, rubber diaphragms, stoppers, or other sealing means not part of any neck, body, or base portion of a vial or container of the present invention are not part of the "interior surface" of such a vial or container.

For the purposes of the present disclosure the term "hydrodynamically optimized interior surface" means a surface that has been formed so as to provide improved resuspension of sediment. This improvement is accomplished by providing interior surfaces that promote directed laminar flow of the photographic suspension contained in the sealed vial under gentle shaking conditions. A suitable means of achieving this optimization is to provide rounded interior surfaces, especially between bottom and body portions of the containers according to the present invention. The rounding of these interior surfaces may be done by controlling the radii of curvature of the connecting surfaces between the bottom and body portions, as is described in the sequel herein. Other optimization features include the formation and placement of internal rib structures that tend to promote rifled laminar flow during gentle shake of the sealed vial. This hydrodynamic optimization tends to promote a smooth transition in laminar flow in the axial direction to laminar flow in the radial direction, where the axial direction is parallel to the axial symmetry axis of the containers of the present invention, and the radial direction is normal to this axial symmetry axis. This hydrodynamic optimization is further obtained by minimizing or eliminating junctures between structural portions that might tend to disrupt laminar flow along the interior surfaces of the sealed vial assembly. Other suitable means for achieving hydrodynamic optimization in the containers of the present invention include applying chemical coatings to the interior surfaces of the containers of the present invention that tend to minimize adhesion between the interior surfaces of the vial and the components of the photographic suspensions stored in the vial. Another suitable means for achieving hydrodynamic optimization in the containers of the present invention includes applying chemical coatings to the interior surfaces of the containers of the present invention that tend to minimize wetting of the interior surfaces by the components of the photographic suspensions stored in the vial. The exact nature and mechanism by which this improvement is obtained in not entirely understood. Smoothing of the interior surfaces of the containers of the present invention, by mechanical, chemical, or mechanicochemical means also provides hydrodynamic optimization of the interior surfaces of the containers of the present invention. It is believed that such improvement may be obtained by providing smooth hydrodynamic flow over such sediment upon shaking.

For the purposes of the present disclosure the term "cylindrical-radius" means a radius defined by the distance from an axis passing longitudinally through an axisymmetric vial or container to the interior of the wall of a body portion of such vial or container, so that the distance is defined along a line normal to such an axis, said line extending to said interior wall. The phrase "average cylindrical-radius", for the purposes of the present disclosure as applied to body portions of containers of the present disclosure, is defined as the integral of the cylindrical-radius along the axisymmetric axis with respect to axial distance, from the lower to upper limits of the body portion, divided by the length of the body portion.

There are numerous photographically useful materials and substances of the present invention. These substances include dyes, filter dyes, sensitizing dyes, antihalation dyes, absorber dyes, UV dyes, stabilizers, UV stabilizers, redox dye-releasers, positive redox dye releasers, couplers, colorless couplers, competing couplers, dye-releasing couplers, dye precursors, development-inhibitor releasing couplers, development inhibitor anchimerically releasing couplers, photographically useful group releasing couplers, development inhibitors, bleach accelerators, bleach inhibitors, electron transfer agents, oxidized developer scavengers, developing agents, competing developing agents, dye-forming developing agents, developing agent precursors, silver halide developing agents, color developing agents, paraphenylenediamines, para-aminophenols, hydroquinones, blocked couplers, blocked developers, blocked filter dyes, blocked bleach accelerators, blocked development inhibitors, blocked development restrainers, blocked bleach accelerators, silver ion fixing agents, silver halide solvents, silver halide complexing agents, image toners, pre-processing image stabilizers, post-processing image stabilizers, hardeners, tanning agents, fogging agents, antifoggants, nucleators, nucleator accelerators, chemical sensitizers, surfactants, sulfur sensitizers, reduction sensitizers, noble metal sensitizers, thickeners, antistatic agents, brightening agents, discoloration inhibitors, and other addenda known to be useful in photographic materials. Suitable photographically useful substances for dispersal as nanoparticulate suspensions in the methods of the present invention are described in *Research Disclosure,* Volume 176, Item No. 17643, pages 22–31, published December 1978. Among these useful materials of the present invention are blocked compounds and useful blocking chemistry described in U.S. Pat. Nos. 4,690,885, 4,358,525, 4,554,243, 5,019,492, and 5,240,821 the disclosures of which are incorporated by reference herein in their entirety for all they disclose about useful photographic substances and the use of these substances in photographic elements. Numerous references to patent specifications and other publications describing these and other useful photographic substances are given in *Research Disclosure,* December 1978, Item No. 17643, published by Kenneth Mason Publications, Ltd. (The Old Harbormaster's, 8 North Street, Emsworth, Hampshire P010 7DD, England) and in T. H. James, *The Theory of The Photographic Process,* 4th Edition, Macmillan Publishing Co., Inc. (New York, 1977).

Preferred filter dyes used as particulate solid substances in the present invention are described in copending, commonly assigned European Patent Application 0 549 489 A1 and in U.S. application Ser. No. 07/812,503, *Microprecipitation Process for Dispersing Photographic Filter Dyes* of Texter et al., filed Dec. 20, 1991, as compounds I-1 to I-6, II-1 to II-46, III-1 to III-36, IV-1 to IV-24, V-1 to V-17, VI-1 to VI-30, and VII-1 to VII-276 therein, The disclosure of U.S. application Ser. No. 07/812,503 is incorporated herein by reference.

Particularly preferred filter dyes used as particulate solid substances in the present invention, because of their ease of manufacture and efficacy in photographic elements, include the following:

Suitable couplers and dye-forming compounds for the particulate solid substance of the present invention are described in U.S. Pat. Nos. 3,227,550, 3,443,939, 3,498,785, 3,734,726, 3,743,504, 3,928,312, 4,076,529, 4,141,730, 4,248,962, 4,420,556, and 5.322,758, the disclosures of which are incorporated herein by reference for all they teach about couplers and dye-forming compounds substituted with weakly acidic aqueous solubilizing groups.

Suitable blocked color developers for the particulate solid substance of the present invention are described in U.S. Pat. Nos. 5,240,821 and 5,256,525, especially compounds 6 and 8-35 in U.S. Pat. No. 5,240,821, the disclosures of which are incorporated herein by reference for all they teach about blocked developer compounds substituted with weakly acidic aqueous solubilizing groups.

Sensitizing dyes suitable for the nanoparticulate suspensions of the methods of the present invention are described in U.S. Pat. Nos. 2,493,748, 2,503,776, 2,519,001, 2,688,545, 2,912,329, 2,977,229, 3,397,060, 3,522,052, 3,527,641, 3,617,293, 3,628,946, 3,656,959, 3,666,480, 3,672,897, 3,672,898, 3,679,428, 3,694,217, 3,703,377, 3,814,609, 3,837,862, 4,025,349, 4,046,572, 4,026,707, and 4,474,872, the disclosures of which are incorporated herein by reference.

The nanoparticulate suspensions of the method of the present invention can be formed by techniques well known in the art. These techniques include precipitating or reprecipitating the photographically useful compound in the form of a dispersion, and/or using milling techniques such as ball-milling, sand-milling, or media-milling to form a dispersion of such a photographically useful compound. Reprecipitation techniques, such as dissolving the photographically useful compound and precipitating by changing the solvent and/or the pH of the solution in the presence of a surfactant, are well-known in the art. Milling techniques are well-known in the art and are described, for example, in U.S. Pat. No. 4,006,025, the disclosure of which is incorporated herein by reference.

The preparation of nanoparticulate dispersions of developer precursors are disclosed in U.S. Pat. No. 5,240,821, the disclosure of which is incorporated herein by reference. The preparation of nanoparticulate dispersions of color couplers are disclosed in U.S. Pat. No. 5,401,623, the disclosure of which is incorporated herein by reference. The preparation of nanoparticulate dispersions of color couplers for color diffusion transfer elements are disclosed in U.S. application Ser. No. 8/125,990 of Texter, *Solid Particle Coupler Dispersions for Color Diffusion Transfer Elements* filed Sep. 23, 1993, the disclosure of which is incorporated herein by reference. The preparation of nanoparticulate dispersions of thermal solvents for use in nonaqueous thermal dye-diffusion transfer is disclosed in U.S. Pat. No. 5,360,695, the disclosure of which is incorporated herein by reference.

Methods of preparing nanoparticulate suspensions by reprecipitation are described by H. Füredi-Milhofer and A.

G. Walton on pages 203–272, Chapter 5, entitled *Principles of precipitation of fine particles*, in *Dispersion of Powders in Liquids—With Special Reference to Pigments*, Third Edition, Edited by G. D. Parfitt, and published by Applied Science Publishers of Englewood, New Jersey in 1981. Methods of preparing nanoparticulate suspensions by milling methods are described by D. A. Wheeler on pages 327–361, Chapter 7, entitled *Technical aspects of dispersion*, in *Dispersion of Powders in Liquids—With Special Reference to Pigments*, Third Edition, Edited by G. D. Parfitt, and published by Applied Science Publishers of Englewood, New Jersey in 1981. Methods of preparing nanoparticulate suspensions suitable for the methods of the present invention are described by T. C. Patton in *Paint Flow and Pigment Dispersion—A Rheological Approach to Coating and Ink Technology*, Second Edition, published by John Wiley & Sons of New York in 1979.

The nanoparticulate suspensions of the methods of the present invention have a weight average diameter of less than 5,000 nm. In preferred embodiments of the methods of the present invention, the nanoparticulate suspensions have a weight average diameter of less than 1,000 nm, in order to minimize the light scattering of such nanoparticulates when place in photographic elements. It is particularly preferred that the nanoparticulate suspensions of the methods of the present invention have a weight average diameter of less than 300 nm, in order to more dramatically reduce the light scattering by such suspensions when used in photographic elements wherein control of light scattering is an important feature in controlling image quality.

Improved containers of the present invention, for storing nanoparticulate suspensions, comprise a base portion, a top portion remote from said base portion, and a body portion unitary with said base and top portions, said portions defining an interior storage chamber hydrodynamically optimized for the resuspension of sedimented nanoparticulate suspensions, said top portion further including a neck portion defining an opening into said storage chamber, said body portion further comprising a body wall with interior and exterior surfaces, said base portion further comprising a base with interior and exterior surfaces. This top portion in a preferred embodiment comprises a lip portion suitable for affixing thereto a crimpable sealing-assembly for sealing the contents of said storage chamber from the ambient atmosphere.

Figure 1:
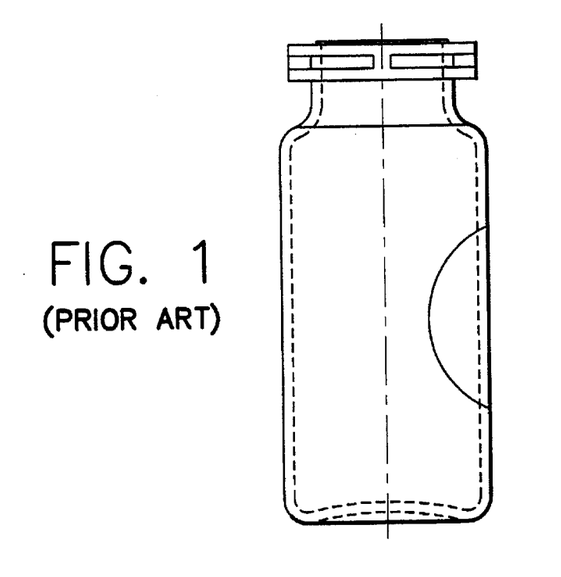
Figure 3:
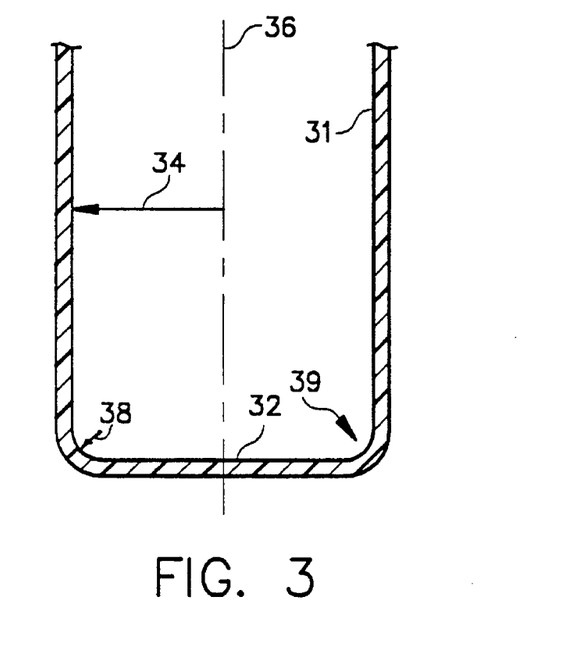
Figure 4:
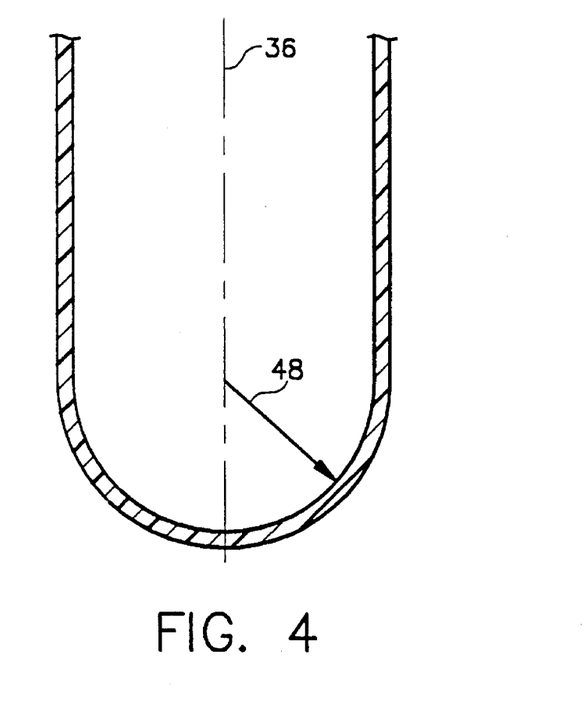

An embodiment of the interior surface of containers of the present invention with respect to the body and base portions, and the connection of these portions, is illustrated in FIG. 3. The interior surface 31 of the lower part of a body portion 31 is shown connected to the interior surface 32 of a bottom portion. In this embodiment, the body portion has cylindrical walls, and 34 is shown as the cylindrical radius, $r_c$. The cylindrical radius is shown extending between the interior surface 31 and the symmetry axis 36. The connecting radius, $r_e$, is shown as 38. This connecting radius defined the interior surface of the connection, 39, between the interior surfaces of the body and base portions. In order to effect hydrodynamic optimization of the shape of the interior of the containers of the present invention, it is suitable to have a connecting surface that is defined by a single, finite, connecting radius. The prior art example of FIG. 1, for example, illustrates a connecting surface that requires at least two radii of curvature for definition. These two radii have opposite curvature. Improved resuspension obtains when this single connecting radius is greater than 20% of the cylindrical radius. It is preferred that this connecting radius be greater than 30% of the cylindrical radius, in order to expedite resuspension rates. It is particularly preferred that this connecting radius be greater than 50% of the cylindrical radius, because such configurations reduce the extent of retained sediment. FIG. 4 illustrates the limiting case where the connecting radius 48 is equal to the cylindrical radius 34.

Figure 5:
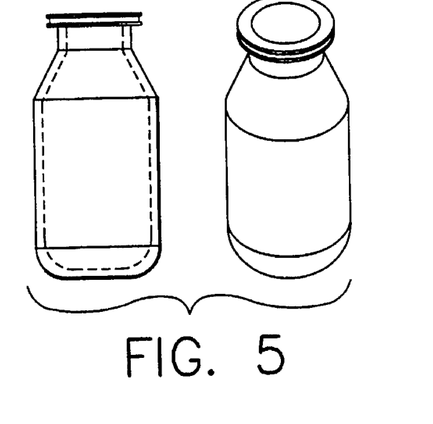
Figure 6:
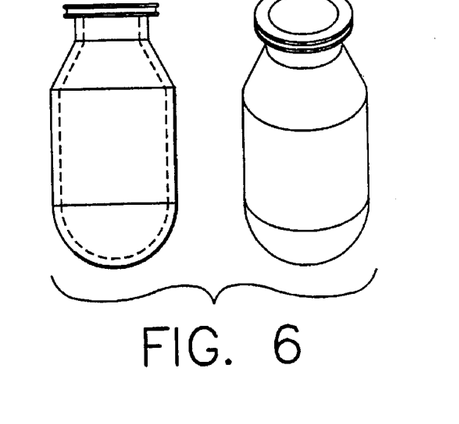
Figure 7:
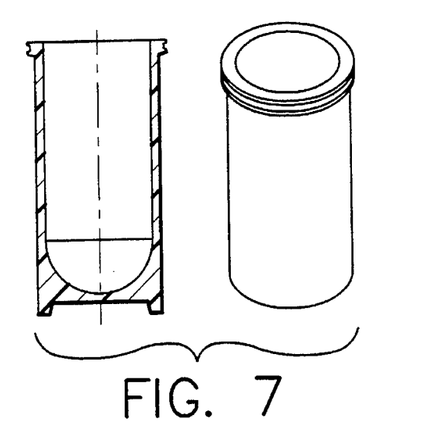
Figure 8:
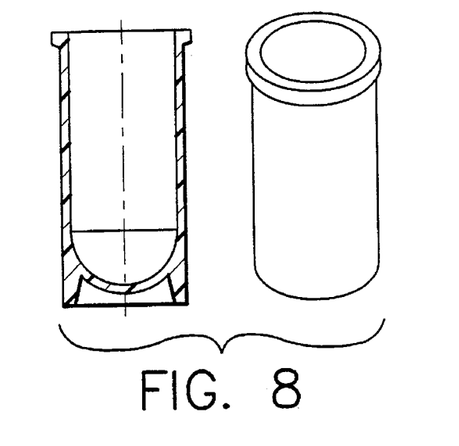

FIGS. 5, 6, 7, and 8 illustrate embodiments of containers according to the present invention that have cylindrical walls. The embodiment illustrated in FIG. 5 has a connecting radius that is 50% of the cylindrical radius. The examples of FIGS. 6, 7, and 8 illustrate the case where the cylindrical and connecting radii are equal. The embodiment of FIG. 6 has a hemispherical bottom portion that coincides with the connecting portion. Containers of this design are preferably used with supportive packaging, such as a styrofoam base support, to maintain mechanical stability. FIG. 7 illustrates an embodiment suitable for injection molding manufacture. FIG. 8 illustrates another embodiment suitable for injection molding manufacture.

A further embodiment of this invention comprises the vial containing a top portion further comprising a lip portion suitable for affixing thereto a crimpable or threaded sealing-assembly for sealing the contents of said storage chamber from the ambient atmosphere. Suitable crimpable sealing assemblies are described in U.S. Pat. No. 5,230,429 and references cited therein. Suitable threaded sealing assemblies include threaded caps that may be threaded upon a threaded lip portion of a top portion of a vial of the present invention.

Containers with internal rib structures are known in the art. Such containers have been motivated, for example, by the need to have increased internal surface area as is advantageous for cell culture, as described by Smith and Siena in U.S. Pat. No. 4,912,048. Such containers generally teach away from hydrodynamically optimized designs of the present invention, because increased surface areas with accompanying capillarity, as obtained by rippled and fluted shapes, will tend to retain fluid and to provide loci for particle adhesion to interior surfaces. Other motivations for having internal rib structures are exemplified by Uhlig in U.S. Pat. Nos. 3,956,441 and 4,170,622. Internal ribbing as disclosed by Uhlig provides for increased structural stability of blown bottles when a goal is to provide a structurally stable vessel utilizing walls as thin as possible for a particular application. In these cases, internal rib structures provide significantly enhance mechanical reinforcement. However, these structures also teach away from hydrodynamically optimized designs, because such ribs and flute structures as disclosed by Uhlig will tend to interfere with hydrodynamic flow and will retain suspension due to the capillarity introduced by such ribs and flutes.

Figure 9:
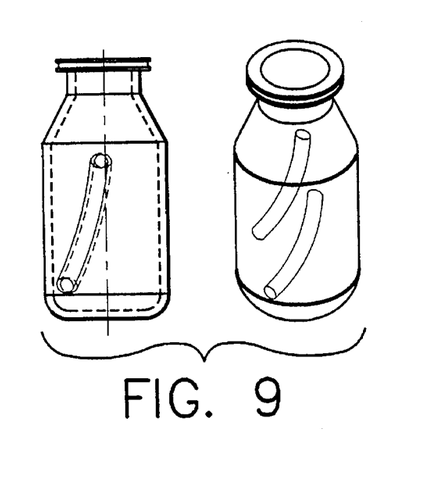
Figure 10:
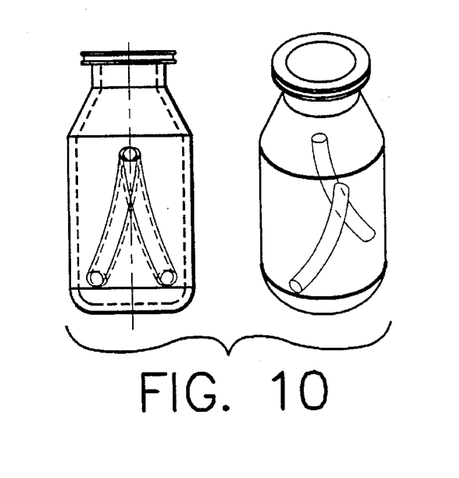

Rifled internal rib structures have not been disclosed as advantageous for the storage of nanoparticulate suspensions and have been found herein to be advantageous for such storage. Rifling provides for directed flow, and such flow will act to disrupt sediment when impinging upon sediment. Vial and container designs of the present invention incorporating a plurality of internal rib structures comprising rifled ribs are illustrated in FIGS. 9 and 10. The embodiment illustrated in FIG. 9 has a pair of rifled ribs, rifled in opposite (out-of) phase. The examples illustrated in FIG. 10 has two symmetrically placed ribs in-phase Another preferred embodiment of the containers of the present invention includes ampules, where access to the contents is achieved by controlled breakage of a rupturable thin-walled section of the ampule or by breakage of a neck portion of an ampule. The body and bottom portions of such ampules are designed and fabricated according to the invention shapes described above for the containers of the present invention. The top and neck portions are modified so as to facilitate access, when needed, by controlled breakage.

The containers of the methods according to the present invention may be formed into aerosol spray containers, wherein dispensing is driven by pressurized with gas. The construction of various embodiments of aerosol spray containers are described in U.S. Pat. Nos. 3,083,883, 3,591,089, 4,121,772, 5,014,884, and 5,038,972, the disclosures of which are incorporated herein in by reference. Such assemblies, when modified according to the hydrodynamically optimized teaching of the present invention, as embodied for example in the design illustrated in FIG. 3, offer the possibility of improved resuspension of nanoparticulate suspensions dispersed from such containers.

The containers of the methods of the present invention may be formed into spray containers, wherein dispensing is driven by manually operated pump assemblies, incorporated into or onto the hydrodynamically optimized storage containers of the present invention. The construction of various embodiments of such spray containers and manually actuated pumps for such spray containers are described in U.S. Pat. Nos. 3,384,081, 3,589,563, 3,797,748, 3,955,720, 3,986,644, 3,987,006, 3,995,774, 3,995,776, 4,072,252, 4,077,549, 4,082,223, 4,129,235, 4,157,774, 4,230,277, 4,235,373, 4,313,568, 4,352,443, 4,415,122, 4,624,413, 4,728,009, 5,014,884, 5,205,442, 5,249,718, and 5,267,674, the disclosures of which are incorporated herein in their entirety by reference. The construction of various embodiments of such spray containers and manually actuated pumps for such spray containers are also described in Australian Patent Abridgment Nos. 16503/83 and 20471/83, in British Patent Specification Nos. 1 526 459 and 1 532 818, and in French Brevet D'Invention No. 77 22195. Such assemblies, when modified according to the hydrodynamically optimized teaching of the present invention, as embodied for example in the design illustrated in FIG. 3, offer the possibility of improved resuspension of nanoparticulate suspensions dispersed from such containers.

The spray containers of the methods of the present invention are suitable for use in storing the photographically useful nanoparticulate suspensions of the present invention. They are also useful for storing and dispensing nanoparticulate suspensions of pigments, paints, clays, toners, magnetics, ceramics, metal oxides, latices, kaolins, inorganic sulfates, cosmetics, pesticides, abrasives, and fertilizers. Dyes and pigments suitable for the nanosuspensions of the methods of the present invention are described by P. Gregory in *High-Technology Applications of Organic Colorants* published by Plenum Press in New York in 1991 (ISBN 0-306-43637-X). Mineral pigments and extenders, white pigments and extenders, colored inorganic pigments, black pigments, metallic pigments organic pigments, synthetic resins, primers, paints, coating mixtures, and methods for preparing the same, suitable for the methods of the present invention are disclosed in *Outlines of Paint Technology,* Third Edition, by W. M. Morgans, published by Halsted Press, New York, in 1990 (ISBN 0-470-21654-9). Nanosuspensions of these materials may be aqueous based or nonaqueous-solvent based, and any known reprecipitation means or milling means may be used to prepare such suspensions, subject to the "nanoparticulate" size constraint described above.

Methods of preparing nanoparticulate suspensions of inorganic pigments are described by H. D. Jeffries on pages 395–469, Chapter 9, entitled *Dispersion of inorganic pigments,* in *Dispersion of Powders in Liquids —With Special Reference to Pigments,* Third Edition, Edited by G. D. Parfitt, and published by Applied Science Publishers of Englewood, New Jersey in 1981. Methods of preparing nanoparticulate suspensions of organic pigments are described by R. B. McKay and F. M. Smith on pages 471–505, Chapter 10, entitled *Dispersion of organic pigments,* in *Dispersion of Powders in Liquids—With Special Reference to Pigments,* Third Edition, Edited by G. D. Parfitt, and published by Applied Science Publishers of Englewood, New Jersey in 1981.

There are no restrictions to the type of material that containers according to the present invention may be made from. Examples of suitable materials include glass, plastics, metals, elastomers, and any organic or inorganic material that is formable and mechanically stable. These suitable materials include polystyrene, polyethylene terephthalate, derivatives of polyethylene terephthalate, polyethylene terephthalate in combination with additives such as glycol, and other transparent polymeric resins. Examples of suitable materials include thermoset and thermoplastic resins, glass, as well as metals such as stainless steel.

For those applications where clarity is a design consideration, materials such as glass and clear plastic resins are preferred. Examples of clear thermoplastic resins include polycarbonate (PC), polyester (PET), polymethylpentene (PMP), polypropylene (PP), and polysulfone (PSO).

In applications where clarity and terminal sterilization is a requirement, the material selection needs to take into account the build up of internal pressure and elevated temperatures. Examples of materials that are preferred for applications such as this would be glass or plastic resins such as PC, PP, PSO, and amorphous polyolefins such as CZ resin (Daikyo Goma Seiko, Ltd., Tokyo).

Particularly preferred resins of the present invention are formed from one or more cyclic olefin compounds or bridged polycyclic hydrocarbon compounds, as a polymeric component, as described in European Patent Applications EP 0 524 802 A1 and EP 0 556 034 A1 and in U.S. Pat. No. 5,288,560. These resins are denoted hereafter as "cyclic" resins. Monocyclic olefin compounds and their alkyl derivatives and acrylate derivatives are preferably used as these cyclic olefin compounds. Bridged polycyclic hydrocarbons having at least one unsaturated bond in the ring or substituent are preferable used as these bridged polycyclic hydrocarbon compounds. The disclosure of U.S. Pat. No. 5,288,560 is incorporated herein in its entirety for all that is disclosed about containers for foods, sanitary articles, cyclic olefinic compounds, bridged polycyclic hydrocarbon compounds, resins fabricated with cyclic olefinic compounds, resins fabricated with bridged polycyclic compounds, and means and methods for fabricating such resins.

The cyclic resin of the present invention preferably has a bromine number of at most 1 and a softening point of at least 130° C. Preferred cyclic resins of the present invention are non-crystalline (amorphous), are alkali resistant, water proof, heat resistant, and excellent in transparency.

Suitable cyclic olefin compounds for use in these cyclic resins include cylcopentadiene, cyclopentene, methylcyclohexene, dimethylcyclohexene, cyclooctene, lower alkyl derivatives of these monocyclic olefin compounds having 1 to 3 lower alkyl groups such as methyl, ethyl, etc., and substituted acrylate derivatives of these monocyclic olefin compounds.

Preferred bridged polycyclic hydrocarbon compounds for use in these cyclic resins include bridged cyclic hydrocarbon compounds containing two or more rings, in particular, bridged polycyclic olefin compounds and derivatives thereof, or bridged polycyclic saturated hydrocarbon compounds having unsaturated double bonds in the substituents thereof, illustrative of which are bridged polycyclic cycloalkene compounds and lower alkyl derivatives, aryl derivatives, or aralkyl derivatives thereof and vinyl derivatives, allyloxycarboxy derivatives and methacrylocy derivatives of bridged polycyclic cycloalkane compounds. Suitable examples of such bridged polycyclic compounds include bicyclo[2,2,1]-2-heptoene, bicyclo[2,2,1]-2,5-heptodiene, ethyl-bicyclo[2,2,1]-2-heptoene, ethylidene-bicyclo[2,2,1]-2-heptoene (ethylidene-2-norbornane), phenyl-bicyclo[2,2,1]-hepti-2-ene, dicyclo[4,3,0]-3,8-nonadiene, tricyclo[4,3,0,1$^{2,5}$]-3-decene, tricyclo[4,3,0,1$^{2,5}$]-3,8-decene (3,8-dihydro-dicyclopentadiene), tricyclo[4,4,0,1$^{2,5}$]-3-undecene, tetracyclo[4,4,0,1$^{2,5}$,1$^{7,10}$]-3-dodecene, ethylidene-tetracyclo[4,4,0,1$^{2,5}$,1$^{7,10}$]-3-dodecene, pentacyclo[7,4,0,1$^{2,}$ $_5$,0,0$^{8,13}$,1$^{9,12}$]-3-pentadecene, dimethyl-hexacyclo[6,6,1,1$^{3,}$ $_6$,1$^{10,13}$,0$^{2,7}$,0$^{9,14}$]-4-heptadecene, pentacyclo[6,5,1,1$^{3,6}$,0$^{2,7}$, 0$^{9,13}$]-4-pentadecene, ethylidene-ethyltetracyclo[4,4,0,1$^{2,5}$, 1$^{7,10}$]-3-dodecene, bis(allyloxycarboxy)tricyclo[4,3,0,12,5]-decane, bis(methacryloxy)tricyclo[4,3,0,1$^{2,5}$]-decane, bis(acryloxy)tricyclo[4,3,0,1$^{2,5}$]-decane, methyloxycarbonyltetracyclo[4,4,0,1$^{2,5}$,1$^{7,10}$]-3-dodecene, and hexacyclo[6, 6,1,1$^{3,6}$,1$^{10,13}$,0$^{2,7}$,0$^{9,14}$]-4-heptadecene.

In the cyclic resins of the present invention it is preferred to use at least one of the above described cyclic olefin compounds and bridged polycyclic hydrocarbon compounds as a polymeric component, Lower olefins, aromatic compounds or vinyl monomers of lower olefins or aromatic compounds can be contained as a copolymeric component in the cyclic resins of the present invention. Ethylene, propylene, isoprene, butadiene, methylpentene, norbornene, butene, vinyltoluene, and the like are suitable examples of such lower olefins and aromatic compounds and vinyl monomers of lower olefins or aromatic compounds. These other polymeric components can be used individually or in combination.

The cyclic resins of the present invention may be synthesized by methods well known in the art. These methods are described and exemplified in detail by Sudo et al. in U.S. Pat. No. 5,288,560, at columns 7–14 therein, the disclosure of which is incorporated herein by reference.

It is desirable to have containers that are robust in mechanical strength and chemical inertness. It is also desirable to have light containers so that shipping costs can be minimized. To that end it is preferred that the materials used in embodiments of the present invention for the fabrication of bottom, body, and neck portions of the containers of the present invention have a density of 1.9 g cm$^{-3}$ or less. It is particularly preferred that such materials have a density of 1.5 g cm$^{-3}$ or less, to further decrease the weight of such containers.

Any suitable method known in the art for forming the shapes of the containers of the present invention Out of the materials of the containers of the present invention may be used. For high volume and low cost, containers of the present invention fabricated out of organic polymer are preferably injection molded, blow molded, and injection-blow molded by methods well known in the art. Different plastic molding processes may be used to manufacture the present articles and containers. Injection-blow molding and blow molding are preferred processes because of their compatibility with high volume production needs and applicability to diverse shapes.

Injection molding is a well known processing technique for forming plastic containers. Injection molding consists of two stages: (1) injection of hot resin into a cavity; (2) cooling of the resin, separation of the mold halves, and ejection of the part. A particular difficulty in making containers with the injection molding process is the requirement that the mold core, which forms the cavity of the container, must be withdrawn from the solidified part. When a design calls for a neck with a smaller diameter than the cavity diameter, as many vial, container, and bottle designs do, then the part cannot be ejected. Therefore, injection molding may be used to manufacture nearly any design where the mouth of the vial, container, or bottle is the largest opening accessible to the inner cavity. The diameter of the inner cavity usually decreases as the cavity approaches the bottom portion of the vial, container, or bottle. An exception arises for larger containers when the mouth of the vial or container is only slightly smaller than the remainder of the cavity. In this instance a collapsible core can be used so that the part can be ejected. Injection molding techniques are well known in the art, and additionally are described in the book *Injection Molding Handbook by* Rosato a Rosato (Van Norstrand Reinhold Company Inc., 1986). Designs shown in FIGS. 7 and 8 are suitably made by the injection molding process.

Blow molding is a suitable manufacturing method for making plastic containers and can be divided into three main categories: (1) extrusion blow molding (EBM), which principally uses an unsupported parison; (2) injection blow molding (IBM), which use a parison supported by a metal core pin; and (3) stretch-blow molding (SBM), which can start either with EBM or IBM. In SBM the vial is stretched at prescribed temperatures (orienting temperature) which greatly improves the material properties. In each blow molding process, air pressure is used to expand the hot plastic into the form of the cavity mold.

Extrusion blow molding (EBM) consists of three stages: (1) the hot resin is extruded through a die forming a tubular parison; (2) the female cavity is closed on the parison and compressed air is forced into the center of the parison such that the hot parison blows out to match the cavity shape; (3) after cooling of the formed parison, the mold opens and the cooled part drops out. Usually a trimming operation is required to remove the excess parison from the final part. Extruding a tubular parison with ribs during EBM is known in the art and is described for example in U.S. Pat. No. 3,114,932, the disclosure of which is incorporated herein by reference.

Injection blow molding (IBM) consists of three primary stages:

(1) Plastic resin is injected into a split cavity mold to produce a preform. The preform is shaped like a test tube with a steel core in the center.

(2) The hot preform is transferred on its core to the second stage cavity where it is blown to final shape against the cool outer cavity.

(3) During the third stage the mold cavity opens and the part is ejected.

Uhlig, in U.S. Pat. No. 3,956,441, incorporated herein by reference in its entirety, uses the IBM process to form internal ribs in a bottle. The technique used by Uhlig is for the desired effect of maintaining a smooth and continuous outer surface.

The stretch blow molding (SBM) process is much like IBM, except that the preform is mechanically stretched axially during the blowing stage. This axial stretching, in addition to the circumferential stretch, causes a phenomenon called biaxially molecular orientation, which increases the barrier and mechanical material properties of the resin. As a result, thinner walled containers can be fabricated and lesser grade raw materials may be effectively used in fabrication without sacrificing final materials performance. This tradeoff yields lower production costs. Typically, the SBM process is a three stage process:

(1) Plastic resin is injected into a split cavity mold to produce a preform. The preform is shaped like a test tube with a steel core in the center, just like EBM.

(2) The hot preform is transferred on its core to the second stage cavity where it is blown and mechanically stretched via the movement of a stretch rod to final shape against the cool outer cavity.

(3) During the third stage the mold cavity opens and the part is ejected.

Kelsey, in U.S. Pat. No. 5,242,066, incorporated herein by reference, utilizes SBM to form internal ribs in a container Blow molding techniques are known in the art, and are described in detail, for example, in the book *Blow Molding Handbook* by Rosato & Rosato (Hanser Publishers, 1989).

In some applications a single material will not provide all of the desired requirements of the vial or container. To obtain all the required specifications, multilayers of plastic resin may be required. All of the present invention designs may be produced by either the Coextrusion Blow Molding or Coinjection process. Both of these processes are known in the art as described in the previously referenced books by Rosato & Rosato.

Other suitable methods of fabrication of the containers according to the present invention are glass blowing methods, as are well known in the art. These well known methods may easily be modified so as to obtain the improved vial shapes and designs of the present invention.

The containers according to the present invention that are fabricated out of thermoset and thermoplastic resins are preferably formed by initially injection molding a preform and then blowing the injection molded preform into a mold cavity thereby biaxially orienting the side wall of the vial or container. The vial or container may be formed by a stretch-blow molding technique in which the injection molded preform is first stretched axially into substantially its final axial length before being blown to its final transverse dimension. This axial stretching may take place by the top of the axial preform which is to form the neck of the vial or container being held in a mold and, at the same time, the base portion of the preform being pushed away from the neck by more than one push rod which enters the preform through the neck and engages its base to push it away form the neck to stretch axially the preform. Other methods of axially stretching the preform are described by Kelsey in U.S. Pat. No. 5,242,066, the disclosure of which is incorporated herein by reference in its entirety.

A suitable method for fabricating model containers out of UV-curable resins utilizes stereolithography. This method is best used for prototyping, since a maximum of a few dozen containers can be fabricated at one time, and fabrication can take many hours. The optimal use of this method of fabrication is to make models for testing. Geometrical designs for the containers to be fabricated are first developed and reduced to a suitable CAD (computer aided design) computer file, required to drive the sterolithography building machine. Many suitable software packages are available for creating, storing, and transmitting such designs, and a suitable package is the PRO/Engineer CAD software package, available from Parametric Technology Corp (Waltham, Mass.). A suitable stereolithographic building machine is available from 3D Systems (Valencia, Calif.). This method provides rapid prototyping by successively curing adjacent cross-sections of photopolymerizable resin until the whole is formed. With this method containers are literally grown in a vat of liquid resin. Fabrication in such machines uses a computer driven UV laser to cure cross-sectional elements of the container being "grown". Containers are fabricated in a vat of UV-curable resin, containing an elevator or moving platform and a wiper blade. A computer driven UV laser is used to initiate polymerization of a thin cross-sectional element of the container being "grown", by repetitively scanning a suitable cross-sectional volume element at the top surface of the vat. After sufficient exposure to obtain polymerization, the supporting elevator (and "growing" models thereon) is raised out of the vat, lowered back into the vat of resin, and the wiper blade is passed over the last cured cross-section. The elevator is then lowered further, and the next cross-sectional volume element is cured with the UV-laser. These operations are repeated cyclically until the entire, three-dimensional structure has been cured. Containers so fabricated may then be drained of resin and dried, or preferably hardened further in a UV oven. After drying, such containers may be sanded, painted, coated with a protective coating of any kind. Acrylate-based coatings are preferred, especially when acrylate-based resins are used. A suitable resin for such fabrication is the UV-curable resin XB 5143 from Ciba-Geigy. XB 5143 resin is an acrylate blend of aliphatic urethane acrylate, dimethacrylate, diacrylate, and 1-vinyl-2-pyrolidinone. A suitable acrylate coating is Krylon™ Clear Acrylic spray from Sherwin-Williams (Solon, Ohio).

Containers according to the present invention fabricated from various materials may be coated for various functional and decorative purposes. Containers of the present invention that are sensitive to UV light may be coated with UV-absorbing paints, lacquers, absorber dye compositions, and the like in order to afford protection against UV radiation. Containers of the present invention that are fabricated with materials permeable to oxygen are preferably coated with polymeric barrier layers intended to be impervious to oxygen.

Containers of the present invention fabricated from glass are preferably coated with thin plastic coatings in order to impart improved mechanical robustness and to afford additional protection against damaging UV or visible radiation. Such protection is particularly advantageous when the nanoparticulate photographic material stored or contained in such containers is photochemically labile under UV or visible radiation. Coatings of various polymeric materials may be made by plastisol dipping, fluidized bed, dry spraying, or by film shrinkage as taught in U.S. Pat. No. 3,604,584, the disclosure of which is incorporated herein by reference. Lubricity coatings to minimize scratching effects are also applied as is well known in the art in order to minimize scratching and marring of newly formed glass surfaces. Emulsified polyethylene mixtures with potassium stearate and/or potassium oleate are taught as lubricity coatings for glass containers in U.S. Pat. No. 2,995,533. Lubricity coating with polyvinylalcohol is taught in U.S. Pat. No. 3,282,729. Preferred methods for applying lubricity coatings to glass containers already having a protective polymeric coating are disclosed by Shonebarger and Brown in U.S. Pat. No. 3,864,151, the disclosure of which is incorporated herein by reference.

Containers of the present invention fabricated from metal are preferably overlaid with an inner or outer layer of protective thermoplastic or thermoset polymer. Such coatings are placed on the interior of containers of the present invention in order to impart chemical stability to the inner surface of the container, with respect to the nanoparticulate suspension placed therein. Outer coatings on such metal containers impart additional mechanical strength and resistance to denting, crushing, etc. Such outer coatings are suitably fabricated from polyethylene, polypropylene, polystyrene, nylon, and polyvinyl chloride. Methods of applying such coatings are taught in U.S. Pat. No. 4,078,508 to Schertenleib, the disclosure of which is incorporated herein by reference.

A suitable method for spray coating containers of the present invention with polymeric layers, including polymeric dispersions and gas or vapor barrier layers, is described by Kennon et al. in U.S. Pat. No. 4,538,542, the disclosure of which is incorporated by reference for all it teaches about spray coating.

The use of the containers of the present invention make possible the improved storage of nanoparticulate suspensions and the improved resuspension of such suspensions. A suitable method of storing nanoparticulate suspensions is obtained by providing a suspension of nanoparticulate substance in the form of a solid particle dispersion; providing an improved vial or container for storing suspensions of nanoparticulates comprising a base portion, a top portion remote from said base portion, and a body portion unitary with said base and top portions, said portions defining an interior storage chamber hydrodynamically optimized for the resuspension of sedimented nanoparticulate suspensions, said top portion further including a neck portion defining an opening into said storage chamber, said body portion further comprising a body wall with interior and exterior surfaces, and said base portion further comprising a base with interior and exterior surfaces; filling said vial or container with a nanoparticulate suspension; and sealing said vial or container against the ambient atmosphere. In certain preferred embodiments the methods of the present invention further comprise containers wherein the top portion further comprises a lip portion suitable for affixing thereto a crimpable sealing-assembly for sealing the contents of said storage chamber from the ambient atmosphere.

The methods of the present invention, when used for the storage of nanoparticulate suspensions subject to bacterial degradation and spoilage, preferably include an additional step of sterilization. This sterilization step is preferably done after the above described sealing step. Sterilization may be done by any of the methods well known in the art. Steam sterilization is preferred because of its relatively low cost and high effectiveness. Radiation sterilization is also preferably used when the materials used to fabricate the vial and containers of the storage method of the present invention are not substantially damaged or weakened by such radiation exposure.

The hydrodynamically optimized containers of the methods of the present invention may be fabricated to hold any useful volume of the nanoparticulate photographic suspensions of the present invention, ranging from less than 10 mL to several hundred liters. Suitable containers of the present invention have storage volumes of less than 100 L. Containers of the present invention having storage volumes of less than 1 L are preferred for applications where less than 1 L of nanoparticulate suspension will be required for use after storage. Containers of the present invention having storage volumes of less than 100 mL are preferred for applications where samples, such as used in testing control applications, are to be stored for long time periods.

After the nanoparticulate chemical substance of the method of the present invention is produced in the form of a solid particle dispersion, and after a hydrodynamically optimized container of the present invention is fabricated, this solid particle dispersion is poured into this container, and this container is then sealed against the ambient atmosphere for storage. The extent of filling may vary as a percent of the available fill volume. In cases where there is some oxygen sensitivity to long time storage stability, the containers of the present method may be filled almost completely with the solid particle dispersion of the present invention, in order to minimize the amount of oxygen place in the container before sealing. Alternatively, this filling step may be done under an inert atmosphere, so that the dead volume remaining in the sealed container is occupied by argon, nitrogen, or some other inert gas, used to displace oxygen or air.

In preferred embodiments of the methods of the present invention, steps comprising heating said nanoparticulate suspension above 100° C. are excluded so that untoward ripening and particle growth of particulates in the nanoparticulate suspensions of the methods of the present invention are minimized. In other preferred embodiments of the methods of the present invention, steps comprising heating the nanoparticulate suspension of the invention above 119° C. are excluded so that unwanted particle ripening and growth and thermally induced degradation of dispersing aids are minimized.

The nanoparticulate suspensions of the present invention, after storage in the containers of the present invention, may be used to form coating melts and coating solutions useful for forming light-sensitive photographic elements. Such elements may be black and white, monochrome, or chromogenic of one or more colors, with or without means of color separation. Useful photographic elements of the present invention are described, for example, in U.S. Pat. Nos. 4,378,424, 4,734,704, 4,791,095, 5,055,373, 5,168,029, 5,213,939, 5,216,438, 5,296,329, 5,298,373, and 5,304,542 and U.S. Statutory Invention Registration No. H953, the disclosures of which are incorporated herein by reference.

The silver halide emulsion employed in the elements of this invention can be either negative working or positive working. Examples of suitable emulsions and their preparation are described in *Research Disclosure,* vol. 308, pages 993–1015, item No. 308119, published December 1989, Sections I and II and the publication cited therein. Silver halide emulsions that may be used in the elements of the methods of the present invention include those wherein silver chloride, silver bromide, or a mixed silver halide such as silver chlorobromide, silver iodobromide, or silver chloroiodobromide is finely dispersed in a hydrophilic polymer such as gelatin. The silver halide can be chosen depending on the intended use of the photographic light-sensitive material from dispersions having a uniform grain size or those having a wide grain size distribution or from dispersion having an average grain size of from 0.1 to 2 μm. These emulsions can be prepared, for example, by a single jet method, by a double jet method or a controlled double jet method, or by a ripening method such as an ammonia method, a neutral method, or an acid method. Also, these silver halide emulsions can be subjected to chemical sensitization such as a sulfur sensitization, a gold sensitization, a reduction sensitization, etc., and can contain a speed increasing agent such as a polyoxyethylene compound, an onium compound, etc. The silver halide emulsion employed in the elements of this invention can be chemically sensitized as described in *Research Disclosure,* vol. 308, pages 993–1015, item No. 308119, published December 1989, Section III and the publication cited therein. Further, a silver halide emulsion of the type wherein latent images are predominantly formed on the surface of the grains or of the type where latent images are predominantly formed inside the grains can be used in the present invention. Also, two or more kinds of silver halide emulsions prepared separately and then mixed may be employed to advantage. The silver halide emulsions of the elements of the methods of the present invention may be chemically sensitized using gold compounds as described in U.S. Pat. Nos. 2,399,083, 2,540,085, 2,597,856, and 2,597,915, using nobel metals as described in U.S. Pat. Nos. 2,448,060, 2,540,085, 2,566,245, 2,566,263, and 2,598,079, using sulfur compounds capable of forming silver sulfide by reacting with a silver salt, such as those described in U.S. Pat. Nos. 2,487,850, 2,518,698, 2,521,925, 2,521,926, 2,694,637, 2,983,610, and 3,201,254. The disclosures of these U.S. patents addressing chemical sensitization are incorporated herein by reference for all they disclose about sensitization of silver halides and the formation of light-sensitive silver halide photographic elements.

The silver halide emulsion employed in the elements of this invention can be spectrally sensitized as described in *Research Disclosure,* vol. 308, pages 993–1015, item No. 308119, published December 1989, Section IV and the publication cited therein. Suitable spectral sensitizing techniques are described in U.S. Pat. Nos. 2,688,545, 2,912,329, 3,397,060, 3,615,635, and 3,628,964, the disclosures of which are incorporated herein by reference for all they teach about spectral sensitization and the formation of light-sensitive silver halide elements. The spectral sensitizers may be selected as desired depending on the purposes and use of the photographic materials to be sensitized.

Examples of suitable vehicles for the emulsion layers and other layers of elements of this invention are described in *Research Disclosure,* vol. 308, pages 993–1015, item No. 308119, published December 1989, Section IX and the publications cited therein. Hydrophilic high molecular weight polymers suitable as vehicles in the elements and coating melts of the methods of the present invention may include gelatin, polyvinyl alcohol, polyvinyl pyrrolidone, polyacrylamide, alginates, polyacrylic acid salts, copolymer combinations of these polymers, and cross-linking polymers as described in U.S. Pat. No. 4,215,195. Other suitable vehicles include hydrophobic polymer dispersions such as latexes of polybutyl acrylate, etc.

The photographic elements of this invention or individual layers thereof can contain, for example, brighteners (see *Research Disclosure,* vol. 308, pages 993–1015, item No. 308119, published December 1989, Section V), antifoggants and stabilizers (see *Research Disclosure,* vol. 308, pages 993–1015, item No. 308119, published December 1989, Section VI), image dyes, dye precursors, couplers, ballasted couplers, couplers that release photographically useful compounds, colored couplers, diffusible dyes, diffusible dye releasing compounds, antistain agents, and image dye stabilizers (see *Research Disclosure,* vol. 308, pages 993–1015, item No. 308119, published December 1989, Section VII, light absorbing and scattering materials (see *Research Disclosure,* vol. 308, pages 993–1015, item No. 308119, published December 1989, Section VIII), hardeners (see *Research Disclosure,* vol. 308, pages 993–1015, item No. 308119, published December 1989, Section IX), plasticizers and lubricants (see *Research Disclosure,* vol. 308, pages 993–1015, item No. 308119, published December 1989, Section XII) antistatic agents (see *Research Disclosure,* vol. 308, pages 993–1015, item No. 308119, published December 1989, Section XIII), matting agents (see *Research Disclosure,* vol. 308, pages 993–1015, item No. 308119, published December 1989, Section XVI), and development modifiers (see *Research Disclosure,* vol. 308, pages 993–1015, item No. 308119, published December 1989, Section XXI).

The photographic elements can be coated on a variety of supports such as described in *Research Disclosure,* vol. 308, pages 993–1015, item No. 308119, published December 1989, Section XVII and the references described therein.

Photographic elements can be exposed to actinic radiation, typically in the visible region of the spectrum, to form a latent image as described in *Research Disclosure,* vol. 308, pages 993–1015, item No. 308119, published December 1989, Section XVIII and then processed to form a visible dye image as described in Research Disclosure, vol. 308, pages 993–1015, item No. 308119, published December 1989, Section XIX. Processing to form a visible dye image includes the step of contacting the element with a color developing agent to reduce developable silver halide and oxidizing the color developing agent. Oxidized color developing agent in turn reacts with the coupler to yield a diffusible dye.

With negative working silver halide, the processing step described above gives a negative image. To obtain a positive (or reversal) image, this step can be preceded by development with a nonchromogenic developing agent to develop exposed silver halide, but not form dye, and then uniformly fogging the element to render unexposed silver halide developable. Alternatively, a direct positive emulsion can be employed to obtain a positive image.

The following examples illustrate the practice of this invention. They are not intended to be exhaustive of all possible variations of the invention. Parts and percentages are by weight unless otherwise indicated.

EXAMPLES

Examples 1–3

An aqueous-based nanoparticulate suspension of the photographically useful filter dye FD2 is prepared using roller-milling processes, as described, for example, by D. A. Wheeler on pages 327–361 in *Dispersions of Powders in Liquids—With Special Reference to Pigments,* 3rd Edition, Edited by G. D. Parfitt, and published by Applied Science, London, in 1981, and by J. Texter in *Langmuir,* volume 8, 1992, pages 291–298. Approximately 450 g of nanoparticulate suspension is prepared by combining about 45 g of FD2 with about 405 g of distilled water and with about 200 mL of zirconia media approximately 1.8 mm in diameter, placing this combination in a glass jar of about 950 mL volume, and milling on a roller mill for about 7 days. Particle sizes of about 20–300 nm in equivalent spherical diameter are obtained.

Figure 2:
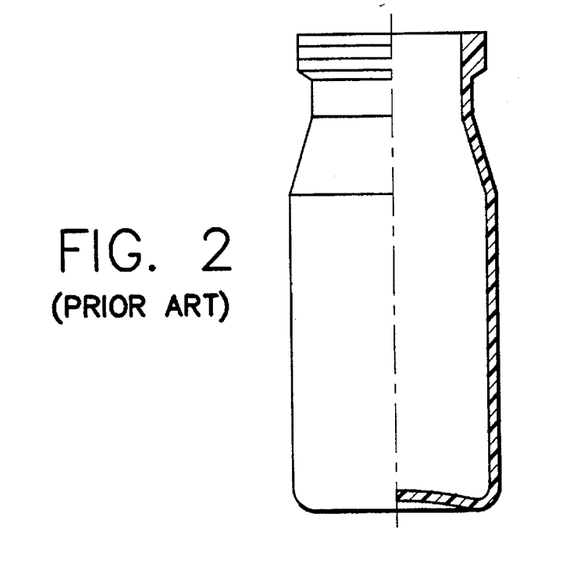

Test containers holding about 13–15 mL volume are prepared according to the designs illustrated in FIGS. 2, 5, and 8 by stereolithography using an automated apparatus. Vial geometries are created as CAD (computer aided design) files with the PRO/Engineer CAD software package (Parametric Technology Corp, Waltham, Mass.). These CAD files are then transferred to a 3D Systems (Valencia, Calif.) stereolithography building machine, and the vials are fabricated automatically using the UV-curable resin XB 5143 (CIBA-GEIGY). XB 5143 resin is an acrylate blend that comprises an aliphatic urethane acrylate, dimethacrylate, diacrylate, and 1-vinyl-2-pyrrolidinone. At the end of the stereolithographic process, in the stereolithography building machine, the resin vat containing the elevator supporting the model containers is drained leaving the photocured models standing on the floor of the elevator. These model containers are then removed and hardened in a UV furnace. After this hardening the containers are sanded and are then coated with Krylon™ Clear Acrylic Spray (Sherwin-Williams, Solon, Ohio). Each container is weighed on an analytical balance to determine its dry weight. The container fabricated according to the design illustrated in FIG. 2 is designated comparison container II. The container fabricated according to the design illustrated in FIG. 5 is designated invention container V. The container fabricated according to the design illustrated in FIG. 8 is designated invention container VIII.

About 10 mL of nanoparticulate FD2 suspension described above is dispensed into each test container, and a rubber stopper is then affixed to the top of each container. Sedimentation is done by centrifugation. A Beckman L8-70 ultracentrifuge with an SW28 swinging bucket rotor is used. The samples are spun at 5000 rpm for about 30 minutes to produce sediment on the bottom of the test containers. Rubber pads are placed in the bottom of each bucket for cushioning. Tape is wrapped around the vials to provide a snug fit between the vials and the interior bucket wall.

A Glas-Col (Terre Haute, Ind.) bench top shaker, Model S60012, is used to simulate hand shaking of the test containers containing sediment. Tube clamps about 10" in length are affixed to each of the six positions of the shaking head. Containers are placed in the jaws of these clamps, so that the axisymmetric symmetry axis of the containers are parallel with the plane of shaking. The shaking is done at a frequency of 2 Hz for about 60 seconds.

The rubber stoppers are removed from each container, and the nanoparticulate suspension of FD2 is poured out, and each container is inverted and placed on absorbent paper towel and allowed to drain for about 10 minutes. Each container is then weighed on an analytical balance, and this weight, minus the dry weight determined earlier, is used to calculate the weight of sedimentary residue retained at the bottom of each container. Examples 1, 2, and 3 correspond, respectively, to the results obtained for residue retained in containers II, V, and VIII. The amount of retained residue or sediment, after these shaking and draining operations, decreases, for the containers, in the order II>V>VIII. These results illustrate the utility of the invention methods of nanoparticulate storage for resuspending sedimented nanoparticulate material.

Examples 4 and 5

An aqueous-based nanoparticulate suspension of the photographically useful filter dye FD2 is prepared using roller-milling processes, similarly as described above for FD2. An aqueous-based slurry about 15% w/w in FD4 is obtained with the aid of oleoylmethyltaurine, sodium salt, as a dispersing aid. Two clear glass cylindrical ampules about 22 mm in outer diameter with body portions about 7.5 cm long are fabricated with bottom portions corresponding to the comparison design illustrated in FIG. 1 (Example 4) and to the invention design illustrated in FIG. 3 (Example 5), with a connecting radius of about 75% of the corresponding cylindrical radius. Each of these ampules are fabricated to narrow concentrically at the top of the body portion to form a breakable-neck portion, about 8 mm in outer diameter, about 7 mm above the top of the body portion. This neck portion extends about 50 mm in the axial direction, widens axisymmetrically to an outer diameter of about 13 mm at a distance of 7 mm above the breakable-neck juncture, and narrows to an outer diameter of about 7 mm another 25 mm above this 13 mm diameter position. After filling with the above described FD4 nanoparticulate suspension, these ampules are sealed under flame and nitrogen at this last described juncture with 7 mm outer diameter. These ampules are then subjected to centrifugally induced sedimentation as described above for about 60 minutes at 5000 rpm, and to a one minute shaking regimen, also as described above for Examples 1–3. These ampules are then broken at the above-described breakable-neck juncture, and allowed to drain in an inverted position for about 10 minutes. The ampules are then weighed. The ampules are subsequently washed with dilute alkali and distilled water, to remove all retained residue of FD4, and then dried and weighed. The amount of retained residue, after initial draining, is then calculated by difference. The invention ampule (Example 5) retains less sedimented FD4 than does the comparison ampule (Example 4). This result illustrates the utility of the invention method of nanoparticulate storage for resuspending sedimented nanoparticulate material.

Examples 6–7

A nanoparticulate suspension of the sensitizing dye SD1 is prepared by high speed stirring. About 10.4 g of SD1 are combined with about 285 g water, and the pH is adjusted to 7 with aqueous 0.1N NaOH. This mixture is stirred for about 2 hours using a high speed agitator, such as that illustrated in FIGS. 1 and 2 of U.S. Pat. No. 4,474,872, operated at about 8,000 rpm, and the

SD1 temperature is controlled at 65° C. during this stirring. Submicron particle sizes are obtained in the range of 300–600 nm.

A comparison ampule and two invention ampules as described above for Examples 4 and 5, respectively, are prepared, and filled with equal 15 g aliquots of this SD1 nanoparticulate suspension and sealed under nitrogen. The comparison ampule corresponds to Example 6. The two filled invention ampules filled with SD1 suspension correspond to Examples 7 and 8. The ampule corresponding to Example 8 is placed in an oil bath at 100° C. for 3 h, and a subsequent chemical analysis shows that the SD1 suspension therein decomposed. The comparison and invention ampules corresponding to Examples 6 and 7, respectively, are then subjected to centrifugally induced sedimentation as described above for about 60 minutes at 5000 rpm, and to a one minute shaking regimen, also as described above for Examples 1–3. These ampules are then broken at the above-described breakable-neck juncture, and allowed to drain in an inverted position for about 10 minutes. The SD1 suspensions collected on draining are set aside and saved. The ampules are then weighed. The ampules are subsequently washed with methanol and distilled water, to remove all retained residue of SD1, and then dried and weighed. The amount of retained residue, after initial draining, is then calculated by difference. The invention ampule (Example 7) ret 3. The method of claim 2, wherein the curvature of the connecting surface has a connecting-radius of curvature, $r_e$, greater than or equal to 50% of the average cylindrical-radius of said body portion.

4. The method of claim 3, wherein the curvature of the connecting surface has a connecting-radius of curvature, $r_e$, equal to the average cylindrical-radius of said body portion.

5. The method of claim 1, wherein the interior surface of said body portion comprises a plurality of rifled ribs placed symmetrically upon said portion.

6. The method of claim 1, wherein said chemical substance is a photographically useful sensitizing dye.

7. The method of claim 1, wherein said chemical substance is a photographically useful filter dye.

8. The method of claim 1, wherein said chemical substance is a photographically useful dye-forming compound.

9. The method of claim 1, wherein said chemical substance is a photographically useful silver halide.

10. The method of claim 1, wherein said chemical substance is a photographically useful developing agent.

11. The method of claim 1, wherein said chemical substance is a photographically useful oxidized developer scavenger.

12. The method of claim 1, wherein the nanoparticulates of said solid particle dispersion have a weight average diameter of less than 5,000 nm.

13. The method of claim 12, wherein the nanoparticulates of said solid particle dispersion have a weight average diameter of less than 1,000 nm.

14. The method of claim 13, wherein the nanoparticulates of said solid particle dispersion have a weight average diameter of less than 300 nm.

15. The method of claim 1, wherein said container has a storage volume of less than 100 L.

16. The method of claim 15, wherein said container has a storage volume of less than 1 L.

17. The method of claim 16, wherein said container has a storage volume of less than 100 mL.

18. The method of claim 1, wherein steps comprising heating said nanoparticulate suspension of the invention above 119° C. are excluded.

19. The method of claim 1, wherein steps comprising heating said nanoparticulate suspension of the invention above 110° C. are excluded.

20. A method for forming coating melts of nanoparticulate suspensions of photographically useful compounds comprising the steps of:

providing a suspension of nanoparticulate photographically useful chemical substance as a solid particle dispersion;

providing a hydrodynamically optimized container for storing nanoparticulate suspensions comprising a base portion and a body portion unitary with said base portion, said portions defining an interior storage chamber hydrodynamically optimized for the resuspension of sedimented nanoparticulate suspensions, said body portion further comprising a body wall with interior and exterior surfaces;

placing said solid particle dispersion in said container;

sealing said container and storage chamber against the ambient atmosphere to form a sealed container;

storing said sealed container;

opening said sealed container; and taking a portion of said solid particle dispersion stored in said container to form a coating composition for a light-sensitive element.

21. The method of claim 20, further comprising subsequent to said taking step, the step of using said coating composition to form a light-sensitive element.

22. The method of claim 21, further comprising the steps of subjecting said light-sensitive element to an imagewise exposure and processing said exposed element to form a developed image.

23. The method of claim 22, wherein said element forms one or more image dyes during said processing.

* * * * *